United States Patent [19]

Smulders et al.

[11] Patent Number: 4,637,777
[45] Date of Patent: Jan. 20, 1987

[54] MANIPULATOR HAVING SIX DEGREES OF FREEDOM

[75] Inventors: Hendricus F. G. Smulders, Eindhoven; Adrianus J. J. Franken, Maarheeze; Johannes W. Faber; Wouter H. Swinkels, both of Eindhoven, all of Netherlands

[73] Assignee: U.S. Philips Corporation, New York, N.Y.

[21] Appl. No.: 671,256

[22] Filed: Nov. 14, 1984

[30] Foreign Application Priority Data

Sep. 11, 1984 [NL] Netherlands .......................... 8402765

[51] Int. Cl.[4] ............................................. B65G 35/00
[52] U.S. Cl. ........................................ 414/751; 269/71
[58] Field of Search ...................... 414/751, 749, 917; 248/485, 487; 269/73, 71

[56] References Cited

U.S. PATENT DOCUMENTS 2,696,565 12/1954 Shockley ............................ 414/1 X
3,407,018 10/1968 Miller .............................. 248/485 X
4,012,030 3/1977 Hesselgren ........................ 269/71 X
4,193,317 3/1980 Oono et al. ....................... 269/71 X

FOREIGN PATENT DOCUMENTS 1146472 of 1969 United Kingdom .
1455782 11/1976 United Kingdom .................. 901/16

Primary Examiner—Joseph E. Valenza
Assistant Examiner—Donald W. Underwood
Attorney, Agent, or Firm—Marc D. Schechter

[57] ABSTRACT

A manipulator having an object holder which can be moved in three directions of translation and three directions of rotation. The object holder is connected by coupling members to driving members secured to a frame. A modular construction is obtained by making the coupling members for the directions of translation and the directions of rotation identical to each other, respectively. The driving members for the directions of translation and the directions of rotation, respectively, are also identical. The modular construction results in a very accurate construction with a minimum number of different components.

4 Claims, 5 Drawing Figures

MANIPULATOR HAVING SIX DEGREES OF FREEDOM

BACKGROUND OF THE INVENTION

The invention relates to a manipulator having an object holder. The object holder is displaceable with respect to a fixed frame in three substantially orthogonal directions of translation and at least one direction of rotation. The object holder is connected through identical first and second coupling members to first and second identical driving members for moving the object holder in the first and second directions of translation. The coupling members are wires, and the driving members are secured to the frame. The object holder is also connected by a third coupling member to a third driving member. The third coupling member is also a wire, and the third driving member is also secured to the frame. The third coupling member and the third driving move the object holder in the third direction of translation. Finally, the object holder is connected through a fourth coupling member to a fourth driving member. The fourth driving member rotates the object holder in a first direction of rotation, and is secured to the frame.

In the known manipulator described above (see, British Pat. No. 1,146,472), the object holder (a table) can be translated in three substantially orthogonal coordinate directions and can be rotated about an axis which is perpendicular to the plane of the table. One of the translations is in a direction perpendicular to the plane of the table by a coupling member and a driving member whose constructions differ essentially from the constructions of the coupling members and driving members for the remaining two directions of translation.

A disadvantage of the known manipulator is that a comparatively large number of different components are required to make the coupling members and driving members for the different directions of translations. Moreover, the number of degrees of freedom of the known manipulator is limited to four. As a result, the table can rotate about only one axis of rotation.

SUMMARY OF THE INVENTION

It is an object of the invention to provide a manipulator with standardized parts and more than four degrees of freedom.

In a manipulator according to the invention, the first, second and third coupling members and the first, second and third driving members are identical to each other. The object holder is further connected to fifth and sixth driving members (secured to the frame) by means of fifth and a sixth coupling members. The fifth and sixth driving members rotate the object holder in second and third directions of rotation, respectively. The fourth, fifth and sixth coupling members and the fourth, fifth and sixth driving members are identical to each other.

Due to the fact that the three coupling members and driving members for the three directions of translation are identical to each other and the three coupling members and driving members for the three directions of rotation are identical to each other, a modulator construction is obtained which requires a comparatively small number of different components. The manipulator therefore has a simple construction and can be mass produced at comparatively low cost. This is especially important for those manipulators (so-called micromanipulators) which have to operate in the submicron range and which therefore have stringent tolerances. Due to the modular construction of the manipulator and the resulting considerably smaller number of components, it is comparatively simple to obtain an accurate construction.

In a preferred embodiment of the manipulator, which is substantially free of clearances, the first, second and third coupling members each comprise a wire spring. The wire spring is clamped near its first end to the object holder and is clamped near its second end to a lever of a first kind. The first lever is rotatable by means of a microdrive. Together with the microdrive, the first lever forms the relevant driving member.

In a further embodiment of the manipulator, in which the rotation of the object holder is essentially independent of the translation, the fourth, fifth and sixth coupling members each comprise a first pair of parallel clamped wire springs. Each first pair of wire springs forms a first parallelogram connection between the object holder and a rigid connection member. A second pair of clamped wire springs parallel to the first pair forms a second parallelogram connection between the rigid construction member and a lever of a second kind. The second lever is rotatable by means of a microdrive. Together with the microdrive, the second lever forms the relevant driving member.

DESCRIPTION OF THE PREFERRED EMBODIMENTS

Figure 1:
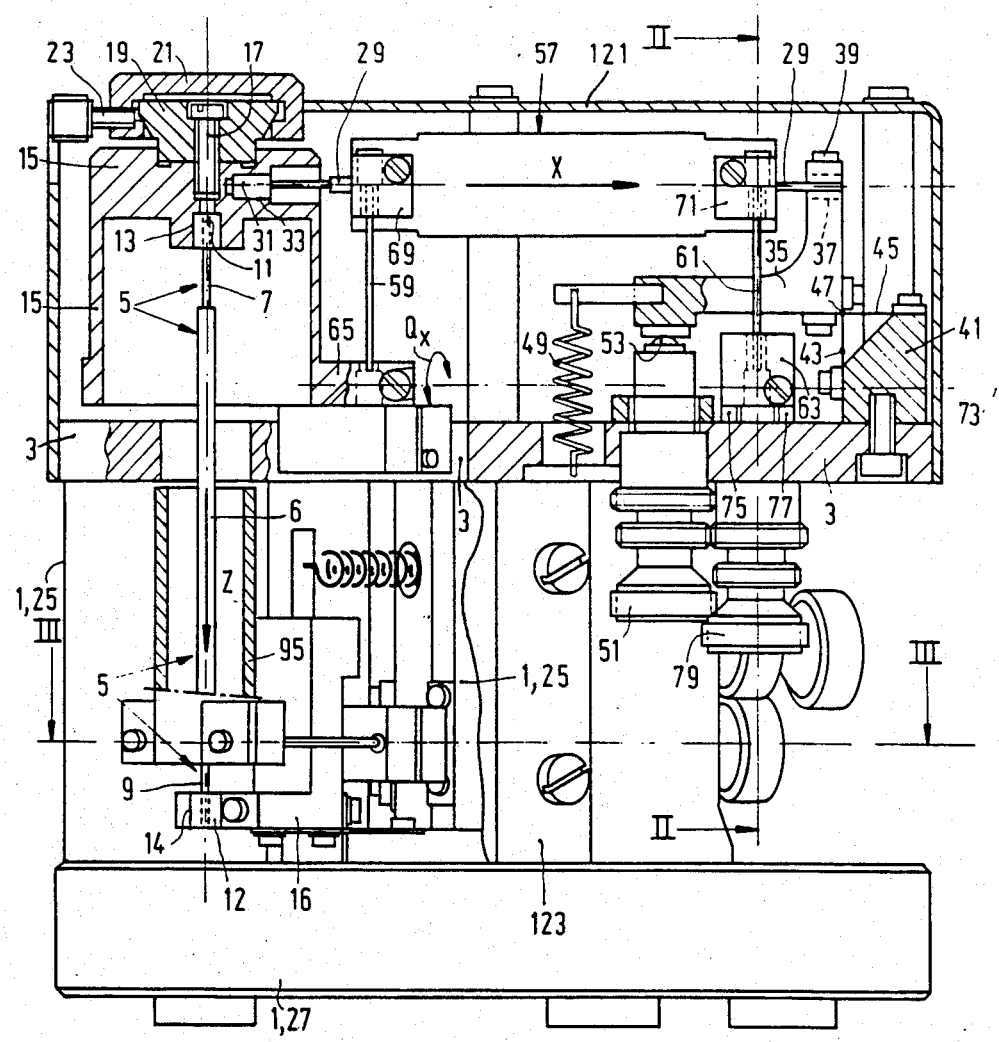
FIG. 1 is a sectional view of the manipulator according to the invention.

The manipulator shown in FIG. 1 has a base plate 3 arranged in a fixed frame 1. A vertical bilaterally clamped wire spring 5 (the third coupling member) having a circular cross-section is provided near its two ends with thin flexible parts 7 and 9. Between the flexible ends, wire spring 5 has a thicker, comparatively rigid central part 6.

The flexible ends 7 and 9 are secured in bearing bushings 11 and 12. The bearing bushing 11 is itself resiliently clamped in a recess 13 in a dish 15. The bearing bushing 12 is resiliently clamped in a recess 14 of a lever 16 (the lever of the first kind) to be described below.

The dish 15 is connected by a bolt 17 to a disk 19. An object holder in the form of a table 21 is secured to disk 19. The table 21 extends partially around the disk 19 and is fixed to the disk 19 by a screw 23.

By means of the flexible end 9, the bilaterally clamped wire spring 5 can be bent in all directions with respect the lever 16. The thickness (rigidity) of the wire spring 5 and the weights of the dish 15, the disk 19 and the table 21 are such that the wire spring 5 will not buckle.

An intermediate block 25 is secured to base plate 3 and a second base plate 27 which is parallel to the first base plate 3. The base plates 3 and 27 and the intermediate block 25 together form the frame 1.

Figure 5:
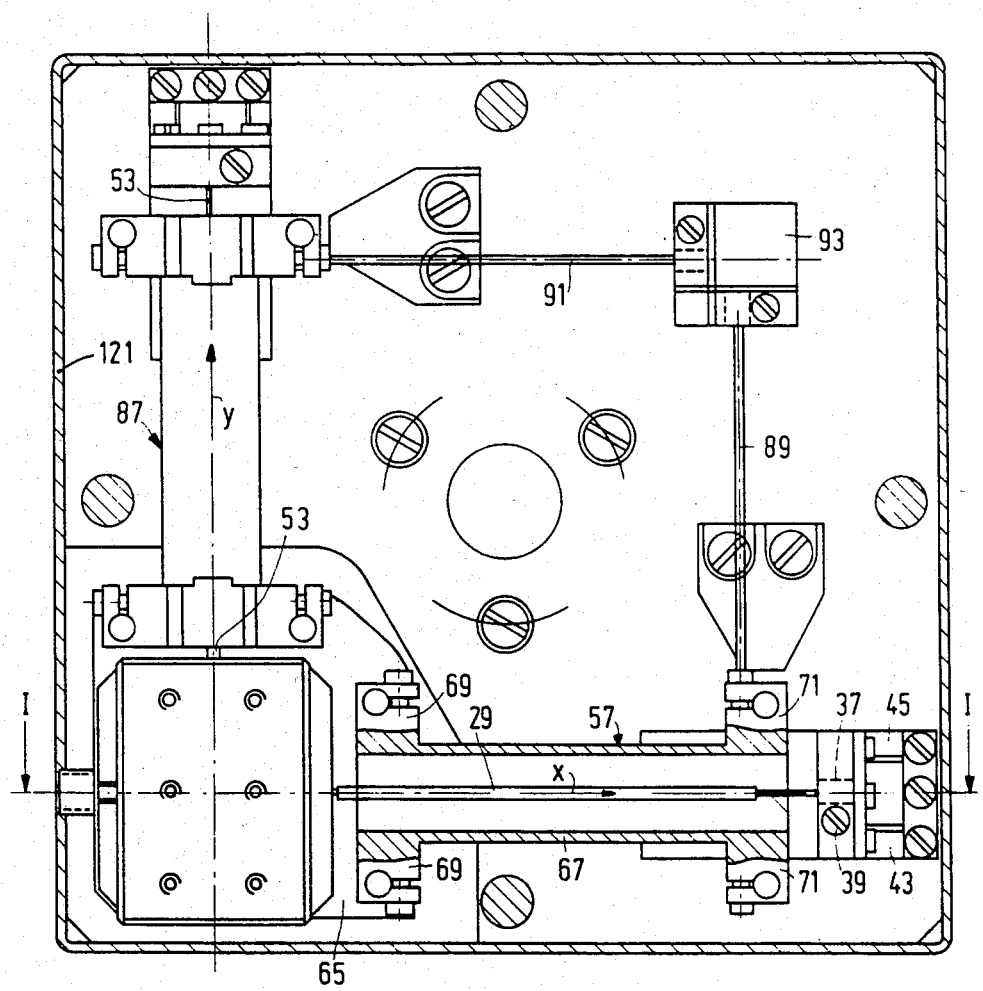
FIG. 5 is top plan view, partly cut away of the manipulator shown in FIG. 1.

A first coupling member for the first direction of translation, X (see FIGS. 1 and 5), comprises a bilaterally clamped circular wire spring 29. By way of spring 29, a tensile force can be exerted on the dish 15. The wire spring 29 is provided at its end near the dish 15 with a bearing bushing 31. Bushing 31 is resiliently clamped in a recess 33 of the dish 15. The wire spring 29 is clamped at its other end in a lever 35 of the first kind. Lever 35 is rotatable about an axis perpendicular to the plane of the drawing in FIG. 1. The wire spring 29 is clamped in the lever 35 in a bearing bushing 37. Bushing 37 is clamped resiliently in lever 35 by a bolt 39 in a bore in the lever 35.

The first base plate 3 has secured to it a block 41. Two pairs of perpendicularly crossing leaf springs 43 and 45 are clamped to block 41. The leaf springs 43 and 45 are also clamped to the lever 35 so that they are clamped bilaterally. The crossing axes of the two pairs of leaf springs 43 and 45 form an axis of rotation 47 for the lever 35. The axis of rotation 47 remains substantially fixed during the rotation of the lever 35.

A tensile spring 49 is connected at one end to the lever 35 and at its other end to the first base plate 3. Rotation of the lever 35 about the axis of rotation 47 is obtained by a known so-called differential microdrive 51 (see the book *Feinmechanische Bauelemente*, 1972, by S. Hildebrand, page 239). The microdrive 51 has a ram 53 which engages the lever 35. The microdrive 51 is operated manually, but may alternatively be coupled to an electric motor which may be servo-controlled. The lever 35 and the microdrive 51 together form the first driving member.

A second coupling member for the second direction of translation, Y (see FIG. 5), is identical to the first coupling member for the first direction of translation, X, and is therefore not described further. A wire spring 53 identical to the wire spring 29 is partly visible in FIG. 5. Also, the relevant lever is rotated by a known microdrive, which is identical to the microdrive 51. The lever and the microdrive together form the second driving member.

Figure 4:
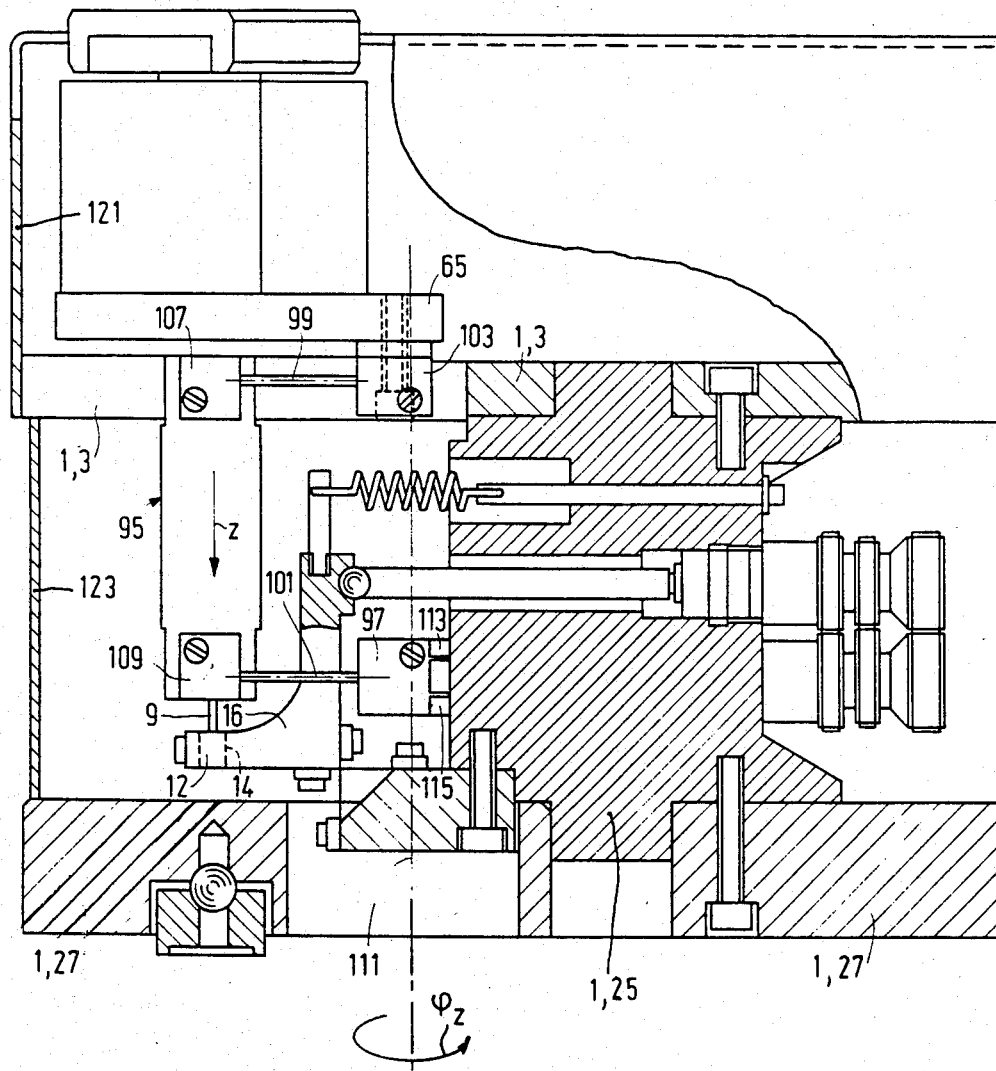
FIG. 4 is a sectional view taken on the line IV—IV in FIG. 3.

The third coupling member, comprising the wire spring 5, for the third direction of translation, Z (see FIG. 4), is identical to the first and the second coupling members. The third coupling member also is not described for the sake of brevity. By means of the bearing bushing 12, the wire spring 5 is resiliently clamped in the lever 16. It should be noted that the wire springs 29 and 53 also have, like the wire spring 5, a comparatively rigid thicker central part and thin flexible ends (not designated by reference numerals). In the neutral position of the manipulator and of the table 21, the wire springs 29 and 53 are perpendicular to each other and are located in the same plane. The wire spring 5 then extends vertically in a plane which is perpendicular to the plane of the wires springs 29 and 53.

Figure 2:
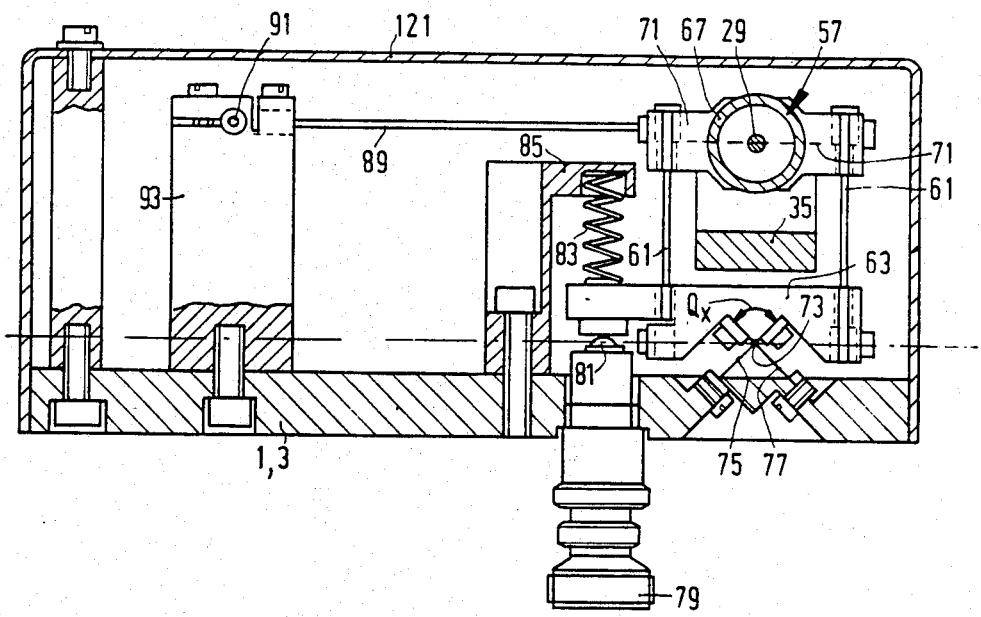
FIG. 2 is a sectional view taken on the line II—II in FIG. 1.

A fourth coupling member for the first direction of rotation, $Q_X$ (see FIGS. 1 and 2), comprises a rigid connection member (pipe) 57 and two pairs of parallel and identical wire springs 59 and 61. Springs 59 and 61 are resiliently clamped to the dish 15 and to a lever 63 of the second kind, respectively. The two wire springs 59 are both clamped near one end to the connection member 57 and near the other end to a flange 65 of the dish 15. The two wire springs 61 are both clamped near one end to the connection member 15 and near the other end to the lever 63. Thus, the wire springs 59 form a parallelogram connection between the connection member 57 and the flange 65, while the wire springs 61 form a parallelogram connection between the connection member 57 and the lever 63.

The connection member 57 is a pipe 67 with flanges 69 and 71. The wire springs 59 and 61 are resiliently clamped in flanges 69 and 71 (see FIG. 1). The wire spring 29, for the first direction of translation, X, extends inside the pipe 67.

The lever 63 of the second kind is rotatable about an axis 73 if the first direction of rotation, $Q_X$. The axis 73 is formed by two pairs of perpendicularly crossing leaf springs 75 and 77. The leaf springs 75 and 77 are clamped at one end to the lever 63 and at the other end to the first base plate 3.

The rotation in the first direction of rotation, $Q_X$, about the axis 73 is obtained by a known so-called microdrive 79. Microdrive 79 has a ram 81 which engages the lever 63 (see FIG. 2). The microdrive 79 is operated manually, but may alternatively be driven by an electric motor.

A compression spring 83 is clamped between the lever 63 and a support 85 secured to the first base plate 3. The axis 73 remains substantially in place during rotation of the lever 63. Due to the rigid connection member 57, wire springs 59 and 61, and flange 65 on dish 15, rotation of the lever 63 about the axis 73 causes the dish 15 to rotate the same amount.

A fifth coupling member for the second direction of rotation, $Q_Y$ (see FIG. 5), is identical to the fourth coupling member for the first direction of rotation, $Q_X$, and is therefore not described further. A connection member (pipe) 87 identical to the connection member (pipe) 57 is partly visible in FIG. 5. The rotation $Q_Y$ is also obtained by a microdrive identical to the microdrive 79.

The connection members 57 and 87 (for $Q_X$ and $Q_Y$) can be positioned by wire springs 89 and 91. Springs 89 and 91 are secured at one end to the relevant connection member and at the other end to a fixed block 93.

A sixth coupling member for the third direction of rotation, $Q_Z$, has the same construction as the fourth and the fifth coupling members for the directions of rotation $Q_X$ and $Q_Y$. The rotation in the direction $Q_Z$ has, however, an effect on the dish 15 and the wire spring 5 which different from that of the rotations in the directions $Q_X$ and $Q_Y$, as will be explained more fully.

The sixth coupling member comprises a rigid connection member (pipe) 95 and a lever 97 of the second kind. The connection member 95 is connected by two pairs of parallel and identical wire springs 99 and 101 (see FIG. 4) to the dish 15 and to the lever 97, respectively. The four wire springs 99 and 101 are all clamped near one end to the connection member 95. The other ends of the springs 99 and 101 are clamped to a block 103 secured to the flange 65 of the dish 15 and to the lever 97, respectively. The two wire springs 99 thus form a parallelogram connection between the connection member 95 and the block 103. The two wire springs 101 form a parallelogram connection between the connection member 95 and the lever 97.

The connection member 95 comprises a pipe 105 with flanges 107 and 109. The wire springs 99 and 101 are clamped in flanges 107 and 109. The wire spring 5 extends inside the pipe 105 for the third direction of translation, Z.

The lever 97 is rotatable about an axis 111 in the third direction of rotation, $Q_Z$. The axis 111 is formed by two pairs of perpendicularly crossing leaf springs 113 and 115. Leaf springs 113 and 115 are clamped at one end to the lever 97 and at the other end to the intermediate block 25. Block 25 is secured both to the first base plate 3 and to the second base plate 27.

Figure 3:
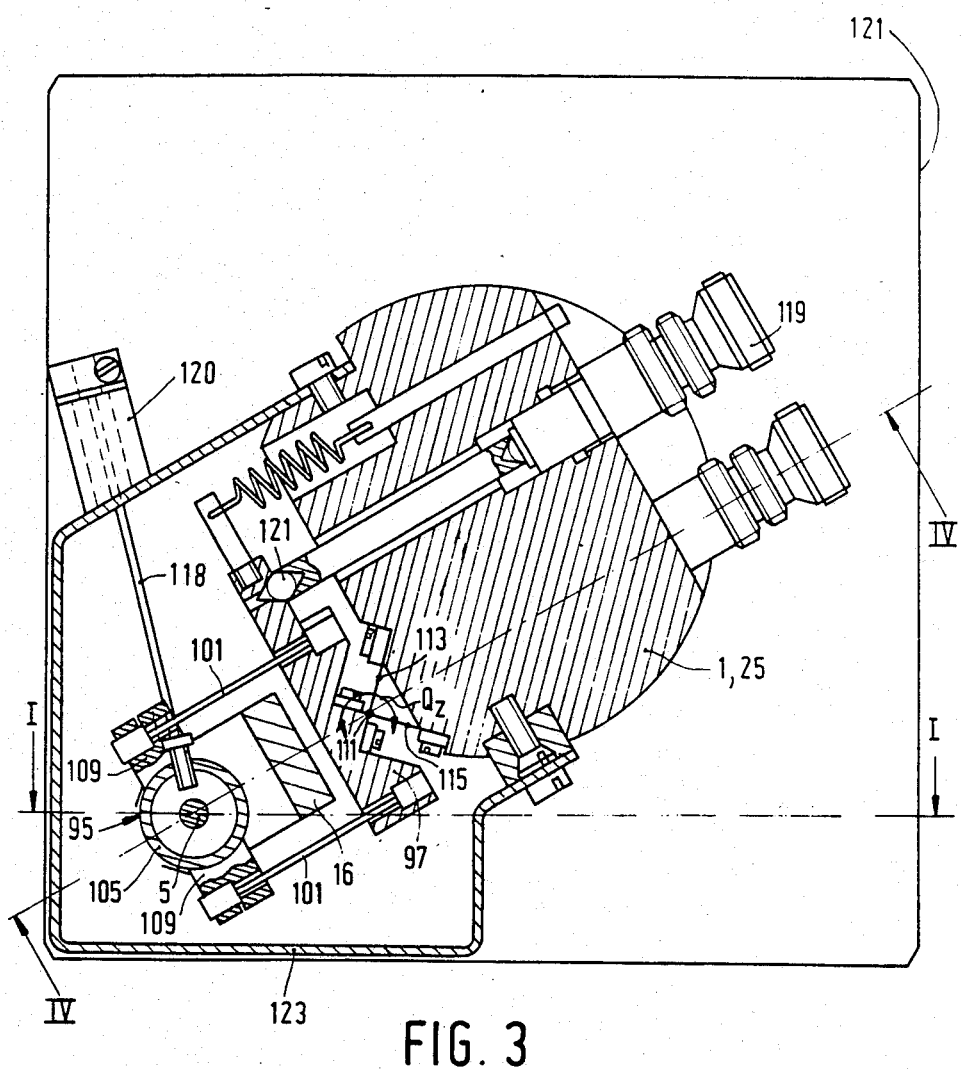
FIG. 3 is a sectional view taken on the line III—III in FIG. 1.

The rotation in the third direction of rotation, $Q_Z$, about the axis 11 is obtained by a known microdrive 119. Microdrive 119 has a ram 121 which engages the lever 97 (see FIG. 3). The microdrive 119 is operated manually, but may alternatively be driven by an electric motor.

The axis 111 remains substantially in place during rotation of the lever 97. The connection member (pipe) 95 is also positioned by a wire spring 118, which is secured to a fixed block 120.

The wire spring 5 is subjected to a bending load during rotations in both directions of rotation $Q_X$ and $Q_Y$. On rotation in the direction of rotation $Q_Z$, the wire spring 5 is subjected to a torsional load (see FIG. 3). Since all translations and rotations are made by flexible wire springs, all movements (i.e. three translations and three rotations) can be made simultaneously. A translation in one of the directions of translation also results in a translation in the two remaining directions of translation. This is not the case with the rotations. The rotations do not influence each other.

It should be noted that all wire springs are glued in the bearing bushings. All bearing bushings are clamped resiliently. As is apparent from FIG. 5, such a clamping can be obtained by incisions, which are resiliently loaded by a bolt. The manipulator is further provided with a hood 121 and a shield 123.

The coupling members may consist of wires which have a constant cross-sections throughout their length. However, thinned circular end portions are used, the central part may have a different cross-section, for example a square cross-section.

The wire springs 5, 29 and 53 may be replaced by comparatively rigid rods which have ball engagements at both ends. Such rods can tilt in all necessary directions.

The rotatable levers of the first and second kinds may be replaced by translation mechanisms of many different constructions. The microdrives may also be of a kind different from that indicated. For example, it is possible to use piezoelectrically or magnetostrictively acting microdrives.

The manipulator can be used especially successfully for performing small displacements of an object in the submicron range. In this case, the object holder may be, for example, a gripper for a robot. For example, the alignment of solid state lasers to optical fibers, the positioning of video recorder heads, the positioning of an object to be illuminated with respect to the illumination source in integrated circuit manufacture, and the positioning of a sample to be examined in an X-ray diffraction apparatus may all be performed by using the manipulator according to the invention.

What is claimed is:

1. A manipulator comprising:
a frame;
six driving members, all six driving members being directly connected to the frame;
six coupling members having first and second opposite ends, the first end of each coupling member being connected to an associated driving member; and
an object holder supported with respect to the frame by the second ends of the coupling members; characterized in that:
three driving members are arranged to displace the object holder in three substantially orthogonal directions of translation with respect to the frame, each translational driving member and its associated coupling member being identical to each other translational driving member and its associated coupling member; and
the remaining three driving members are arranged to rotate the object holder in three substantially orthogonal directions of rotation with respect to the frame, each rotational driving member and its associated coupling member being identical to each other rotational driving member and its associated coupling member.

2. A manipulator as claimed in claim 1, characterized in that:
each translational driving member comprises a rotatable lever of a first kind having two opposite ends, and a microdrive for applying a force to one end of the lever; and
each coupling member associated with a translational driving member comprises a wire spring having its first end clamped to the end of the lever which is opposite the microdrive.

3. A manipulator comprising:
a frame;
six driving members, all six driving members being directly connected to the frame;
six coupling members having first and second opposite ends, the first end of each coupling member being connected to an associated driving member; and
an object holder supported with respect to the frame by the second ends of the coupling members; characterized in that:
three driving members are arranged to displace the object holder in three substantially orthogonal directions of translation with respect to the frame, each translational driving member and its associated coupling member being identical to each other translational driving member and its associated coupling member;
the remaining three driving members are arranged to rotate the object holder in three substantially orthogonal directions of rotation with respect to the frame, each rotational driving member and its associated coupling member being identical to each other rotational driving member and its associated coupling member;
each rotational driving member comprises a rotatable lever having two opposite ends, and a microdrive for applying a force to one end of the lever; and
each coupling member associated with a rotational driving member comprises:
a rigid connection member having first and second ends;
a first pair of parallel wire springs having first and second adjacent ends, the first adjacent ends being clamped to the first end of the connection member, the second adjacent ends being clamped to the object holder; and
a second pair of parallel wire springs having first and second adjacent ends, the first adjacent ends being clamped to the end of the lever which is opposite the microdrive, the second adjacent ends being clamped to the second end of the connection member.

4. A manipulator as claimed in claim 3, characterized in that:
each coupling member associated with a translational driving member comprises a wire spring; and
each rigid connection member comprises a hollow pipe arranged around one wire spring.

* * * * *